Nov. 10, 1942.    C. H. SAUER    2,301,587
RIDGE FORMING DEVICE FOR PNEUMATIC TIRE RIMS
Filed March 28, 1941    2 Sheets-Sheet 1
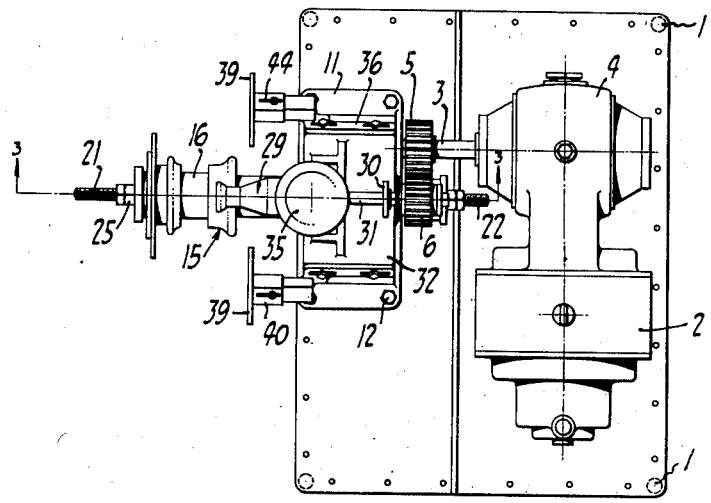
FIG_1_
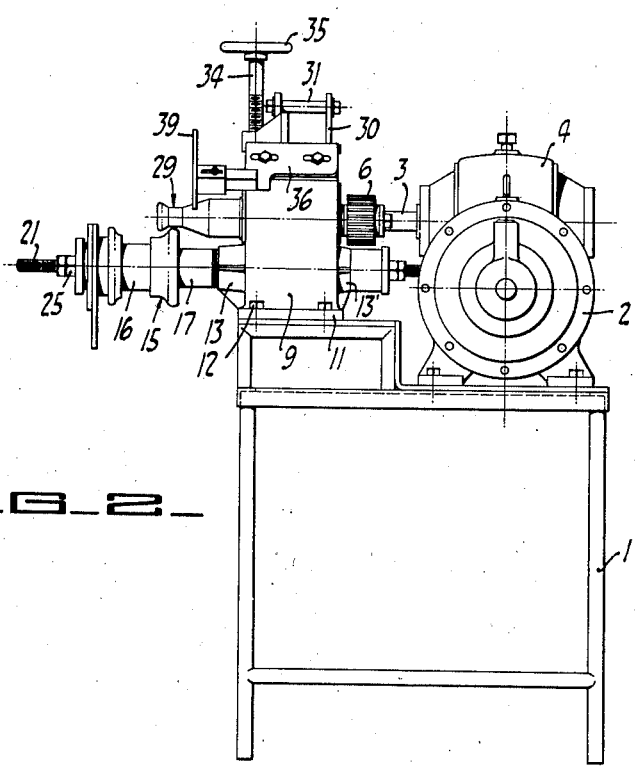
FIG_2_
INVENTOR
Chris H. Sauer
BY
Boyken & Mohler
ATTORNEYS Nov. 10, 1942. C. H. SAUER 2,301,587
RIDGE FORMING DEVICE FOR PNEUMATIC TIRE RIMS
Filed March 28, 1941 2 Sheets-Sheet 2
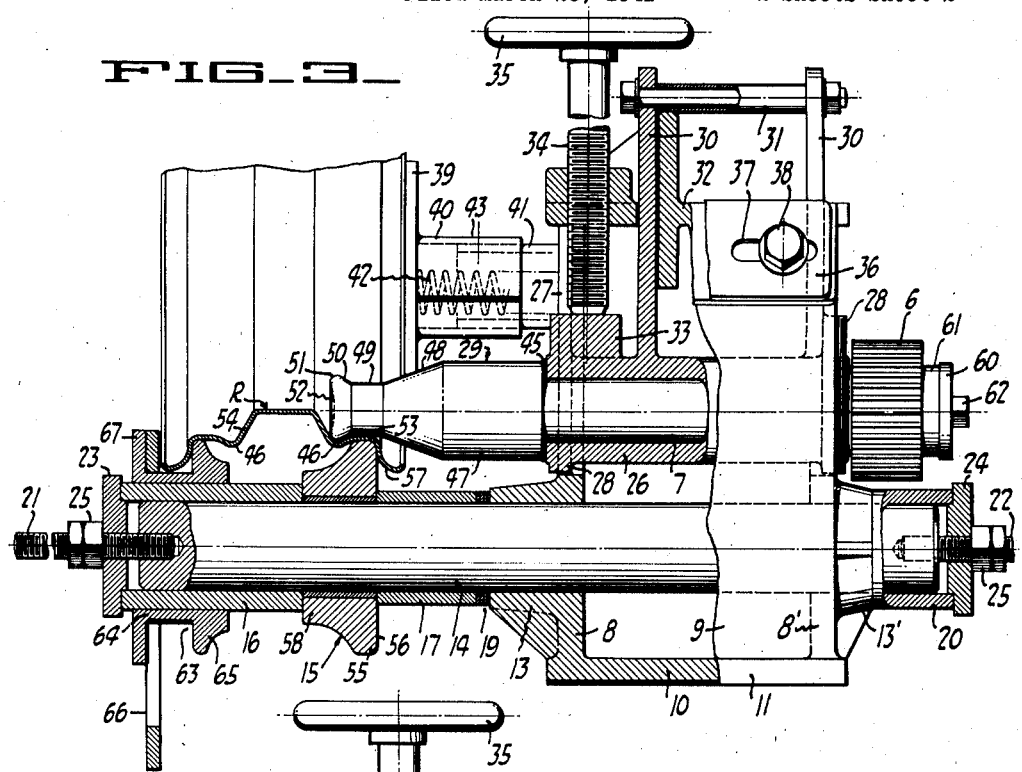
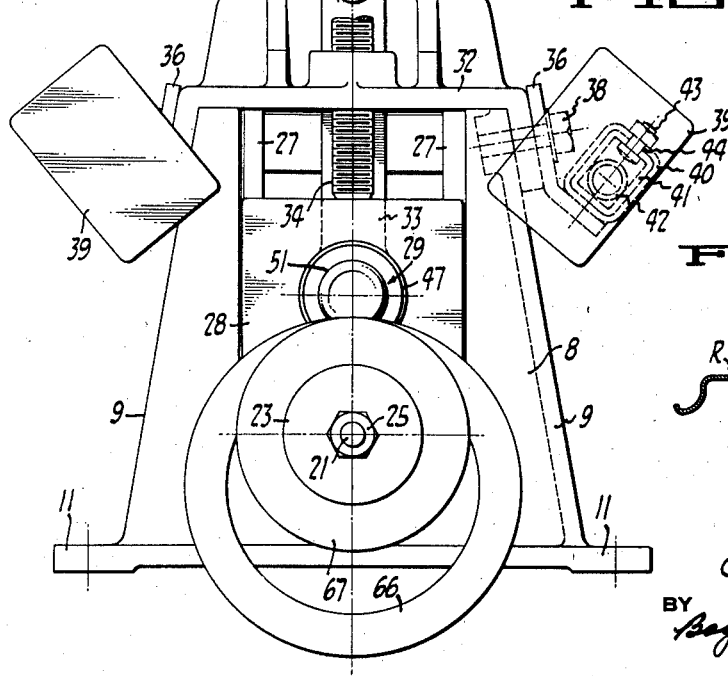
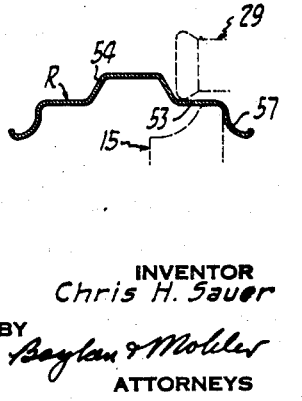
INVENTOR
Chris H. Sauer
BY
Boylan & Mohler
ATTORNEYS Patented Nov. 10, 1942

2,301,587

UNITED STATES PATENT OFFICE 2,301,587

RIDGE FORMING DEVICE FOR PNEUMATIC TIRE RIMS

Chris H. Sauer, Chico, Calif., assignor of one-half to T. R. Rooney, Atherton, Calif.

Application March 28, 1941, Serial No. 385,735

6 Claims. (Cl. 153—28)

This invention relates to a device for forming ridges in conventional, annular, drop-center rims to form rims substantially as disclosed in United States Letters Patent No. 2,198,978 dated April 30, 1940.

One of the objects of this invention is the provision of a simple, rugged, and economically made device that is adapted to quickly and accurately form the desired ridges in conventional automobile tire rims without defacing such rims, and which device is quickly adjustable to rims of various sizes.

Another object is a device of the above character that is adapted to quickly form the desired ridges in a conventional rim without becoming heated to an appreciable degree.

A still further object is the provision of a device for forming the desired ridges in a conventional rim in which the forming of each ridge is accomplished by only one pair of rollers axially offset relative to each other, and only one of which pair is power actuated with the other being an idler freely rotatable by peripheral engagement with the rim revolved by such power driven roller.

Other objects and advantages will appear in the description and drawings annexed hereto.

In the drawings,

Fig. 1 is a plan view of the device of this invention.

Fig. 2 is a side elevational view of said device.

Fig. 3 is an enlarged, fragmentary view, partially in section and partially in elevation, showing the principal operating elements of the device with a rim in position thereon.

Fig. 4 is an elevational view of the device of Fig. 3 as seen at right angles from the point of view of Fig. 3.

Fig. 5 is a cross-sectional view of a conventional, drop-center, one-piece rim before the ridges are formed therein with the ridge forming rollers indicated in dotted line preparatory to forming one of such ridges.

The main part of the invention is illustrated in Fig. 3, and which part is preferably supported at about table height on legs 1, which legs also support a motor 2 that drives a shaft 3 through a conventional speed reducing gear box supported on said legs. Shaft 3 has a spur gear 5 positioned at one lateral side of a spur gear 6 on a shaft 7, said latter gear and shaft being part of the assembly shown in detail in Fig. 3, and more generally illustrated in Figs. 1 and 2. It is obvious, of course, that the motor 2 may be supplanted by a hand crank, although the motor is preferable since it effects faster, and more uniform and more convenient operation of the device of Fig. 3.

The assembly shown in Fig. 3 comprises a generally box-like frame having spaced, opposed, vertical side walls 8, 8' connected by walls 9 that extend convergently upwardly from a base, said latter walls being provided with outwardly projecting lugs or flanges 11 apertured for bolting by bolts 12 to a frame member secured to said legs 1. A base 10 is secured to the lower edge of said walls co-planar with said flanges or lugs. The side walls 8, 8', 9, and base 10 and flanges 11 are preferably cast as an integral unit.

Walls 8, 8' are formed with horizontally aligned bearings 13, 13' supporting a horizontal shaft 14 that extends at its opposite ends outwardly of said walls 8, 8'. This shaft 14 is alongside and parallel with shaft 7.

On the end of shaft 14 that projects outwardly of wall 8 and bearing 13, which latter bearing is in wall 8, is a roller generally designated 15. This roller 15 may be termed an idler since it is freely rotatable on shaft 14, but it is held against axial movement on said shaft by sleeves 16, 17, which sleeves are at opposite sides of said roller, the former being outermost relative to the bearing 14, while the latter is between said roller and said bearing. It is preferable that a plurality of washer-like spacers 19 of various thicknesses be disposed on shaft 14 at one end or the other of sleeve 17, to permit changing the distance of roller 15 outwardly of bearing 13, according to the number and thicknesses of the washers used, although the same result may be accomplished in a less economical manner by having sleeves, such as 17, of various lengths for substitution on shaft 14, as may be desired.

The sleeve 16 projects outwardly of the end of shaft 14 that supports roller 15, and likewise, a sleeve 20 is supported on the end of shaft 14 that projects outwardly of bearing 13', and said sleeve 20 abuts bearing 13' at one of its ends and projects outwardly of the end of said shaft at its opposite end. Threaded rods 21, 22 coaxial with shaft 14 are respectively secured on the opposite ends of shaft 14 and extend centrally through apertures in plates 23, 24, that tightly and slidably, engage the outer ends of sleeves 16, 20 respectively. Outwardly of each of said plates is one or more nuts 25 threaded on said rods, which nuts hold the plates against the sleeves 16, 20 and which plates, when so held, also prevent axial shifting of the sleeves 16, 17, 20 and roller 15 as well as washers 19, but said plates are not tightened against the sleeves 16, 20 sufficiently to bind the roller 15 against freely rotating on shaft 14.

By the foregoing construction, it will be plainly seen that the roller 15 may be readily adjusted axially by substitution of sleeves of various lengths on shaft 14, as well as substitution or removal of one or more of the spacers 19.

The shaft 7 is supported above shaft 14 in a relatively long bearing 26 disposed between walls 8, 8', and which bearing is slidable vertically between guides 27 (Fig. 4), which bearing carries slide members 28 at its ends slidably engaging said guides for said movement. Said guides may be formed by vertically slotting the walls 8, 8'.

The gear 6 that is rigidly secured on shaft 7, is disposed adjacent and above the sleeve 20 that is on one end of shaft 14, while the opposite end of shaft 7 extends outwardly of wall 8 and carries a ridge forming roller generally designated 29, which roller is rigid on shaft 7 for rotation therewith.

Secured to bearing 26, and extending upwardly from said bearing, is a pair of spaced arms 30 that are connected at their upper ends above the upper ends of walls 8, 8', by a horizontal lifting handle 31. These arms 30 slidably extend through openings in a top wall 32 that connects the upper ends of side walls 8, 8' and 9. This handle 31 is therefore accessible for grasping by the hand of an operator for lifting the bearing 26 and shaft 7 together with the roller 29 and gear 6 that are secured on said shaft 7.

On bearing 26 at a point between the roller 29 and the handle 30 that is adjacent said roller, is a boss 33 engaged by the lower end of a vertical screw 34, which screw extends through, and threadedly engages the threads in an aperture formed in top wall 32. The upper end of said screw, at a point substantially spaced above handle 31, is provided with a hand wheel 35 for turning said screw. Thus the shaft 7 with roller 29 secured thereto, may be forcibly urged downwardly by turning said wheel 35 in one direction so as to force the roller against a rim as will be later described more in detail. Upon turning the screw in an opposite direction, the roller 29 will be released for raising by lifting handle 31, to thereby free the roller from the rim for removal of the rim.

Secured to the walls 9 are a pair of horizontal arms 36 that are formed, respectively, with horizontal slots 37 (Fig. 3) through which stud bolts 38 extend into walls 9 for supporting said arms for longitudinal movement thereof, and for securing said arms in adjusted position at any desired position in said movement.

On the ends of arms 36 outwardly of side wall 8, are vertical plates 39 (one for each arm) that are disposed in the same vertical plane, and which plates are yieldably secured to said arms by telescoping sleeves 40, 41 (Fig. 3). One sleeve 40 is secured to each plate 39, while the other sleeve 41 is secured to arm 36. A coil spring 42 is enclosed within each pair of telescoping sleeves 40, 41 that functions to yieldably urge the plates 39 outwardly, relative to side 8, to the limit of movement permitted by bolt 43, which bolt is secured to inner sleeve 41 on arm 36, and extends through a horizontal slot 44 in outer sleeve 40 that carries plate 39. The purpose of these plates and the yieldable mounting thereof will later be explained.

As already stated, the device of this invention is for the specific purpose of forming annular ridges on the conventional, drop-center, one-piece rims that are for pneumatic tires. A cross section of such conventional rim, before a ridge is formed thereon, is shown in Fig. 5. These rims may vary in diameter and in width, as well as in other minor respects, particularly since they are generally rigidly secured on demountable wheels that may vary in design. However, the device of this invention is such as to handle any of the different types now in use.

In Fig. 3 the rim of Fig. 5 is indicated at R after the desired annular ridges 46 have been formed therein. These ridges are separately formed, one being in each of the bead seating portions of the rim at opposite sides of the central well or channel of said rim.

The ridge forming rollers will now be described more in detail, since the shapes of these rollers, and their relation to each other, is very important in accomplishing the desired results.

The roller, generally designated 29, is carried at the outer end of an enlarged cylindrical shank 47 of greater diameter than shaft 7, and coaxial with the latter. One or more spacing washers 45 may be disposed between the shoulder of said shank at the end of bearing 26 and said shank, as desired for adjusting axial movement of roller 29.

The outer end 48 of shank 47 tapers convergently to a reduced neck 49 which neck terminates outwardly of shank 47 in the body of the forming roller, that has a rather abruptly tapered side 50 facing generally axially toward shank 47. The enlarged diameter end of the tapered side 50 merges into a transversely curved peripheral, annular portion 51. The axially outwardly facing side of the body of the forming roller 29 may be flat, and vertical, but is preferably slightly concave, as indicated in dotted line at 52.

This convex outer side ensures against any obstruction on said side to the proper forming of the ridge 46, and the curved portion of said roller that is adjacent the juncture of said axially outer side of said roller and said periphery of the roller, is such as to substantially correspond to the normal cross sectional curvature of the rim at the juncture of the radially inwardly facing side of the bead seating portion 53 of the rim and the side 54 of the central channel in said rim. The diameter of the neck 49 is less than the peripheral diameter of the portion 51 by an amount not less than the desired height of the ridge 46 to be formed in the rim.

Referring to roller 15, this roller is formed with an annular, enlarged diameter portion 55 (Fig. 3) that is offset axially inwardly of annular portion 51 or roller 29, and is formed with a slightly flattened peripheral edge, but the shoulder of annular portion and the flat axially inwardly facing side 56 of said roller that faces sleeve 17, is rounded to fit in the normally rounded, radially outwardly facing side of bead seat 53 of said rim at the juncture between said seat and flange 57 of the rim.

The side of portion 55 of said roller that is opposite side 56, is preferably formed with a hub 58 of reduced diameter relative to portion 55. This hub 58 is provided to give a greater bearing surface for roller 15 on shaft 14.

In operation, the rim of a wheel, which is ordinarily fixed to a disk or spokes, is inserted between roller 29 and roller 15, by first unscrewing screw 34 a sufficient distance to enable sliding the rim axially between said rollers to a position as indicated in Fig. 3. The roller 15 is offset axially relative to roller 29, so that the rounded corner of roller 15 that joins side 56 at the peripheral edge of said roller fits the rim at the juncture between seat 53 and flange 57 of the rim on the outer side of the rim. In this position of the rim, the outer corner of roller 29 at the juncture between side 52 of said roller and its peripheral surface, fits the rim at the juncture between side 54 of the central wall of the channel of the rim and seat 53 of the latter at its radially inwardly side of the rim. Thus the peripheral side of roller 15 is directly below the reduced neck 49 that connects with roller 29 and the peripheral side of roller 29 is over the hub of roller 15 so there is no obstruction to the forming of ridge 46 in the rim as the rollers 29, 15 are moved toward each other.

The rollers 15 and 29 are positively held against any axial shifting relative to each other, and upon simultaneous rotation of roller 29 and tightening of screw 34 the ridge 46 is progressively formed on the rim. The shaft 7 cannot move axially, as plate 62 outwardly of gear 6 secured sleeve 61 on said shaft between the gear hub and the head on a bolt 62 that extends through said plate into the end of shaft 7. The cylindrical shank 47 on the opposite end of the shaft prevents axial movement of the shaft 7 in direction toward gear 6.

After the rim is positioned as shown in Fig. 3, the flange 57 that is opposite the one between rollers 29, 15, will fit in an annular groove 63 in a roller 64, which latter roller is rotatable and axially slidable on sleeve 16. The inner side 65 of said groove, or the side facing roller 15, is formed on its peripheral edge to engage the axially outer side of the rim at the juncture between flange 57 and the bead seat, while a relatively large diameter washer or ring 66 may be dropped into groove 63 to substantially fill the space between flange 57 and outer side 67 of said groove. The groove itself may fit the flange between the sides of said groove, but the provision of an extra wide groove with washer or ring 66, enables quickly fitting the flange 57 in the groove, and by varying the thickness of the washer, the same roller 64 will take any size rim flange and at the same time eliminate undesirable looseness between the flange and the sides of the groove in which the flange fits.

When the rim is supported for rolling the ridge 46 therein, the edge of flange 57 that faces the wall 8, will be slidably supported against the sides of plates 39, thereby preventing any tendency of the rim to commence vibrating or wobbling as the rim is revolved. One plate 39 is generally adequate to accomplish the result of preventing detrimental vibration, but two may be used to give greater support.

As the ridge 46 is progressively formed by tightening the screw 34 during rotation of the roller 29 by motor 2, any distortion of the flanges 57 of the rim, will not affect the ridge, since plates 39 are yieldable, and the roller 64 is slidable axially on sleeve 16. There is no internal stress in the metal of the rim at the ridge and during formation of the latter, as occurs were roller 15 to also be power driven, but instead the metal is merely drawn from the central channel into the ridge and it is important in this connection to note that the neck 49 adjacent roller 29 functions merely as a stop for the deepest ridge it is desired to form, and does not necessarily function as a forming die, although the flattened seat on bead seat 53 between flange 57 and ridge 46 is desirable. This flattened seat will be normally formed even though neck 49 is even more restricted than is shown in the drawing.

Whether roller 29 is above or below the roller 15 is immaterial. The device will function in the same manner if the rollers 29, 15 are reversed in position with roller 15 above roller 29, which reversal would be virtually nothing more than an inversion of the assembly of Fig. 3. In some instances such inversion has been made, and the rim then hangs from roller 29 instead of being supported on roller 15.

It is important to note that the flange 57 that is in the groove 63 is spaced from the bottom of said groove. Thus the side of the rim carrying said flange rides on the periphery of roller 65, which periphery engages the bead seating portion of the rim.

In addition to rolling ridges in a rim, my device also functions to true out of round bead seats, merely by the substitution of suitable bead seat engaging rollers for the ridge forming rollers should ridges not be desired.

Where the bead seats are excessively narrow they may readily be widened by my invention, merely by loosening nuts 25 and thus allowing roller 65 to move axially toward the plane in which roller 51 is disposed. By then putting the rim between the rollers and simultaneously slowly tightening nuts 25 while slowing tightening screw 34, the width of the bead seat may be increased a sufficient amount to form a proper ridge in the seat.

Having described my invention, I claim:

1. A device for forming a radially outwardly projecting ridge in the bead seating portion of a drop-center tire-supporting rim between the central well and the radial bead-engaging flange of such rim, comprising; a pair of axially offset rollers separately supported for rotation about separate, substantially parallel axes and spaced apart to receive said bead seating portion therebetween upon axial movement of said rim; one of said rollers being formed with a corner adjoining its outermost peripheral side adapted to seat against the juncture between said bead-seating portion and the side of the said central well adjacent thereto on the radially inner side of said rim, and the other roller being formed with a corner adjoining its outermost peripheral side to seat against the juncture between said bead-seating portion and the radial bead-engaging flange adjacent thereto on the radially outer side of said rim; means supporting said rollers offset axially and in said positions for engaging said inner and said outer radially facing sides; means for positively driving one of said rollers only, and the outer of said rollers being free for rotation under the influence of rotation of said rim when said rollers are in engagement with opposite sides of said rim and said one roller is positively driven, and means for moving said rollers relatively radially toward each other.

2. A device for forming a circumferential ridge in one of the flat, radially facing, annular bead-seating portions of a tire supporting rim, comprising; a frame having a pair of horizontal, vertically spaced parallel shafts supported thereon and projecting at one of their corresponding ends from a side of said frame; a first bearing rigid on said frame supporting one of said shafts for rotation and a second bearing supporting the outer shaft for rotation; means supporting said second bearing for movement radially thereof toward and away from said first shaft for similarly moving the shaft carried thereby; a first roller rigidly secured to the outwardly projecting end of one of said shafts and an idler roller supported for free rotation on the outwardly projecting end of the other shaft, said first roller and said second roller being offset axially on said shafts and positioned in different parallel vertical planes relatively close to each other to lie within the width of said bead-seating portion and the said second bearing being movable to a position for moving the shaft and roller carried by the latter from a position in which the peripheral surfaces of said rollers are spaced apart vertically to a position in which said surfaces simultaneously engage such bead seating portion when the latter is positioned between said surfaces, and means for forcibly moving said roller against said bead-seating portion when the latter is engaged by said idler roller; and means for positively rotating the shaft carrying said first roller during said last mentioned movement of said first roller for causing rotation of said rim and said idler roller.

3. In a construction as defined in claim 2, said means for moving said first roller into engagement with said bead-seating portion comprising a screw, and a second idler roller supported on the shaft carrying the first mentioned idler roller, positioned to engage a rim when such rim is positioned with one of its bead-seating portion engaged between said first mentioned idler roller and said first roller.

4. In a construction as defined in claim 2, a member on said frame positioned to be engaged by a side of such rim when said bead seating portion of the rim is between said rollers, and means supporting said member for movement in opposite directions axially of such rim and a spring yieldably urging said member against such rim during rotation of the latter.

5. In a construction as defined in claim 2, means securing said rollers against axial movement, and a second idler roller supported on the shaft carrying the first mentioned idler roller for free rotation and for axial movement on said latter shaft, said second idler roller being positioned to engage the other bead-seating portion of a rim when one of such portions of a rim is engaged between said first mentioned idler roller and said first roller.

6. A device for forming an annular ridge in the annular bead-seating portion of a drop-center rim having a central radially outwardly opening well and a radially outwardly extending flange at opposite edges of said portion comprising; a pair of rollers supported for rotation about parallel axes, said rollers being offset axially relative to each other and being free at their oppositely outwardly facing sides to provide adequate clearances at said sides for said flange and for said well when said bead-seating portion is positioned between the peripheries of said rollers; the peripheries of said rollers being positioned to engage opposite sides of said bead-seating portion at points respectively adjacent said well and intermediate said well and flange; means supporting said rollers for rotation on said axes and for relative movement toward and away from each other; and means for positively rotating one of said rollers for forming said ridge during said relative movement of said rollers toward each other.

CHRIS H. SAUER.